(12) United States Patent
Alva et al.

(10) Patent No.: US 11,175,704 B2
(45) Date of Patent: *Nov. 16, 2021

(54) ON-DEMAND TORQUE ENGAGEMENT MECHANISM FOR SECOND DISPLAY ADJUSTABILITY

(71) Applicant: Intel Corporation, Santa Clara, CA (US)

(72) Inventors: Samarth Alva, Bangalore (IN); Krishnakumar Varadarajan, Bangalore (IN); Yogesh Channaiah, Mandya (IN)

(73) Assignee: Intel Corporation, Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/736,390

(22) Filed: Jan. 7, 2020

(65) Prior Publication Data

US 2020/0142454 A1  May 7, 2020

Related U.S. Application Data

(63) Continuation of application No. 16/232,140, filed on Dec. 26, 2018, now Pat. No. 10,534,407.

(51) Int. Cl.
*G06F 1/16* (2006.01)
*F03G 7/06* (2006.01)
*F16D 1/10* (2006.01)

(52) U.S. Cl.
CPC .......... *G06F 1/1681* (2013.01); *F03G 7/065* (2013.01); *F16D 1/10* (2013.01); *G06F 1/169* (2013.01);

(Continued)

(58) Field of Classification Search
CPC .... G06F 1/1616; G06F 1/1647; G06F 1/1681; G06F 1/169; F03G 7/065; F16D 1/10
See application file for complete search history.

(56) References Cited

U.S. PATENT DOCUMENTS

| 1,166,702 A | * | 1/1916 | Mardon et al. ..... E05D 11/1078 |
| | | | 16/329 |
| 7,581,290 B2 | * | 9/2009 | Chang .................... G06F 1/1616 |
| | | | 16/303 |

(Continued)

OTHER PUBLICATIONS

United States Patent and Trademark Office, "Notice of Allowance," dated Sep. 9, 2019 in connection with U.S. Appl. No. 16/232,140, 16 pages.

*Primary Examiner* — Adrian S Wilson
(74) *Attorney, Agent, or Firm* — Hanley, Flight & Zimmerman, LLC

(57) ABSTRACT

Technologies for a hinge for a dual-screen clamshell computing device include a hinge having a drive shaft and a driven shaft. The drive shaft is fixed to a member such as a secondary display housing of the computing device. The driven shaft is rotatably coupled to another member such as a base housing of the computing device. The hinge includes a one-way needle bearing fixed to the same member as the driven shaft. The driven shaft passes through the one-way needle bearing, which allows free rotation of the driven shaft in one direction and prevents rotation of the driven shaft in the other direction. The hinge includes a coupling joint that selectively couples the drive shaft and the driven shaft. The computing device includes a trigger that is operable to selectively engage and disengage the coupling joint of the hinge. Other embodiments are described and claimed.

20 Claims, 5 Drawing Sheets

(52) U.S. Cl.
CPC .......... *G06F 1/1616* (2013.01); *G06F 1/1647* (2013.01)

(56) References Cited

U.S. PATENT DOCUMENTS

| | | | |
|---|---|---|---|
| 7,591,604 B2* | 9/2009 | Roberts | B25F 5/02 16/326 |
| 9,483,083 B1* | 11/2016 | Zaloom | A45C 11/00 |
| 10,534,407 B2* | 1/2020 | Alva | G06F 1/1681 |
| 2003/0172494 A1* | 9/2003 | Oshima | H04M 1/0216 16/285 |
| 2004/0164955 A1* | 8/2004 | Miyashita | G06F 1/1616 345/156 |
| 2007/0169312 A1* | 7/2007 | Ho | G06F 1/1681 16/330 |
| 2014/0063750 A1* | 3/2014 | Mau | G06F 1/1601 361/728 |
| 2014/0259532 A1* | 9/2014 | Millard | E05D 11/1028 16/326 |
| 2014/0273590 A1* | 9/2014 | Sharma | G06F 1/1616 439/350 |
| 2018/0052496 A1* | 2/2018 | Tucker | G06F 1/1681 |
| 2019/0129476 A1* | 5/2019 | Alva | G06F 1/1647 |
| 2019/0220066 A1* | 7/2019 | Sundaram | G06F 1/1677 |
| 2020/0183463 A1* | 6/2020 | Chen | E05D 3/122 |

* cited by examiner

ON-DEMAND TORQUE ENGAGEMENT MECHANISM FOR SECOND DISPLAY ADJUSTABILITY

CROSS-REFERENCE TO RELATED APPLICATIONS

The present application is a continuation application of U.S. application Ser. No. 16/232,140, entitled "ON-DEMAND TORQUE ENGAGEMENT MECHANISM FOR SECOND DISPLAY ADJUSTABILITY," which was filed on Dec. 26, 2018, and which claims the benefit of Indian Provisional Patent Application No. 201841036163, filed Sep. 25, 2018.

BACKGROUND

Laptop computers, notebook computers, and other clamshell devices are popular form factors for portable computing devices. Certain clamshell devices include two display screens. For example, certain gaming-oriented laptops include dual display screens, with one screen in the device lid and the other screen in the device base.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
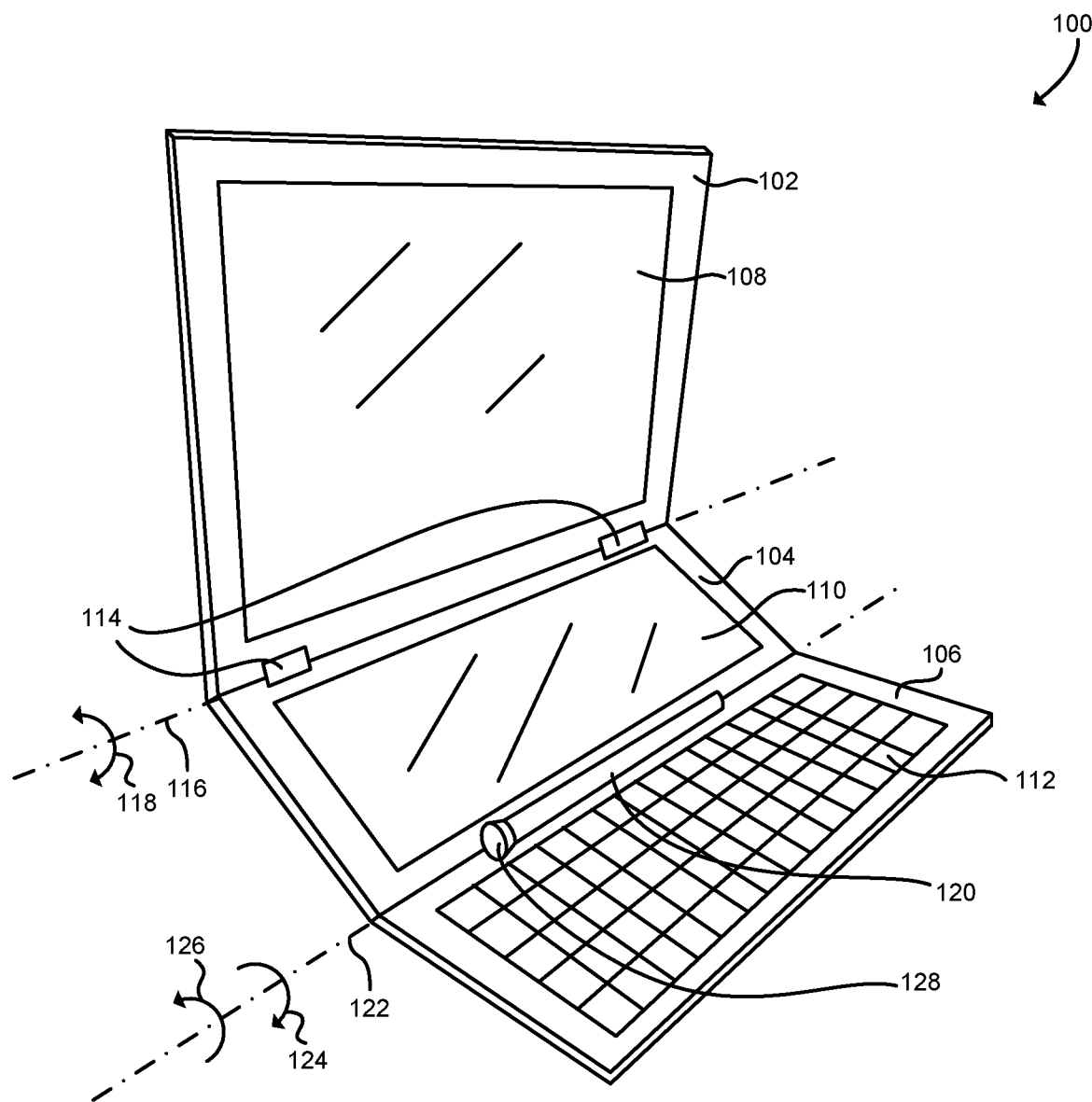
FIG. 1 is a perspective view of at least one embodiment of a dual-screen computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIGS. 1 and 4-7, a dual-screen computing device 100 is shown. The computing device 100 is illustratively a laptop computer; however, the computing device 100 may be embodied as any type of computation or computer device capable of performing the functions described herein, including, without limitation, a computer, a notebook computer, a portable computer, a clamshell tablet computer, a mobile computing device, a gaming console, a network appliance, a web appliance, a processor-based system, and/or a consumer electronic device. Accordingly, the computing device 100 may include a processor, an input/output subsystem, a memory, a data storage device, a communication subsystem, and/or other components and devices commonly found in a laptop computer or similar computing device. Of course, the computing device 100 may include other or additional components, such as those commonly found in a laptop computer (e.g., various input/output devices), in other embodiments.

Figure 4:
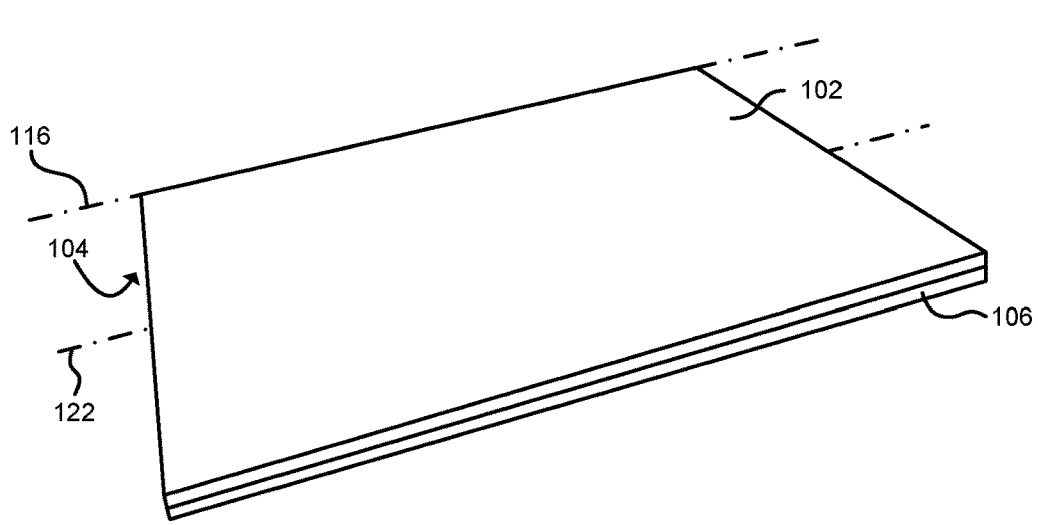
FIG. 4 is a perspective view of the dual-screen computing device of FIGS. 1-3 in a closed configuration.

As best shown in FIGS. 1 and 4, the computing device 100 includes a primary screen housing 102, a secondary screen housing 104, and a base housing 106. Each of the housings 102, 104, 106 may be embodied as metal, plastic, or other structural components or members that support and/or protect other internal and/or external components of the computing device 100. Each housing 102, 104, 106 may be coupled to an internal frame, chassis, or other structural components (not shown) or may be part of a unibody or other integrated chassis.

As shown, the primary screen housing 102 includes a primary display screen 108 and the secondary screen housing 104 includes a secondary display screen 110. Each display screen 108, 110 may be embodied as any type of display capable of displaying digital information, such as a liquid crystal display (LCD), a light emitting diode (LED), a plasma display, a cathode ray tube (CRT), or other type of display device. Each display screen 108, 110 may be used to display graphics, information screens, user interfaces, or other gaming information. In some embodiments, one or more of the display screens 108, 110 may also include a touchscreen or other input device to receive user input.

The illustrative base housing 106 includes a keyboard 112. It should be understood that in some embodiments, the base housing 106 may include one or more additional or alternative user interface devices, such as one or more touch pads, touchscreens, buttons, joysticks, directional pads, pointing sticks, trackballs, track pads, and/or other user interface devices.

The computing device 100 further includes hinges 114 that couple the primary screen housing 102 and the secondary display housing 104. The hinges 114 allow the primary screen housing 102 to rotate relative to the secondary display housing 104 about a pivot axis 116. The primary screen housing 102 may rotate in either direction 118 (i.e., toward the secondary screen housing 104 or away from the secondary screen housing 104). Each of the hinges 114 may be embodied as a torque hinge, friction hinge, or other hinge that allows a user to open the primary screen housing 102 to a desired position, after which the primary screen housing 102 is held in that position. For example, the hinges 114 may be embodied as torque hinges requiring about 12 kgf·cm of torque for rotation.

Figure 2:
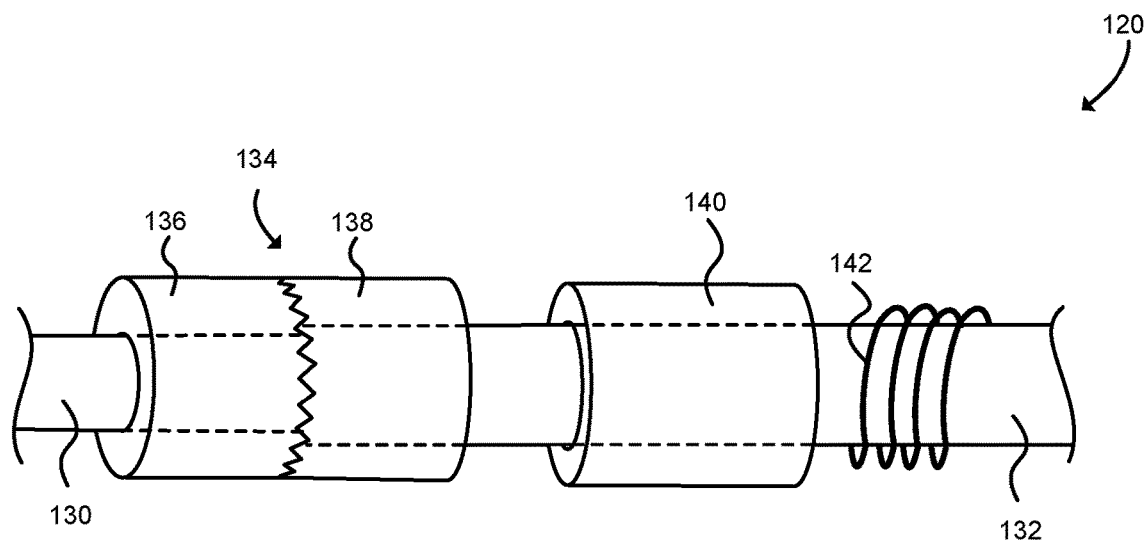
FIG. 2 is a cutaway view of at least one embodiment of a hinge of the dual-screen computing device of FIG. 1 in an engaged configuration.
Figure 3:
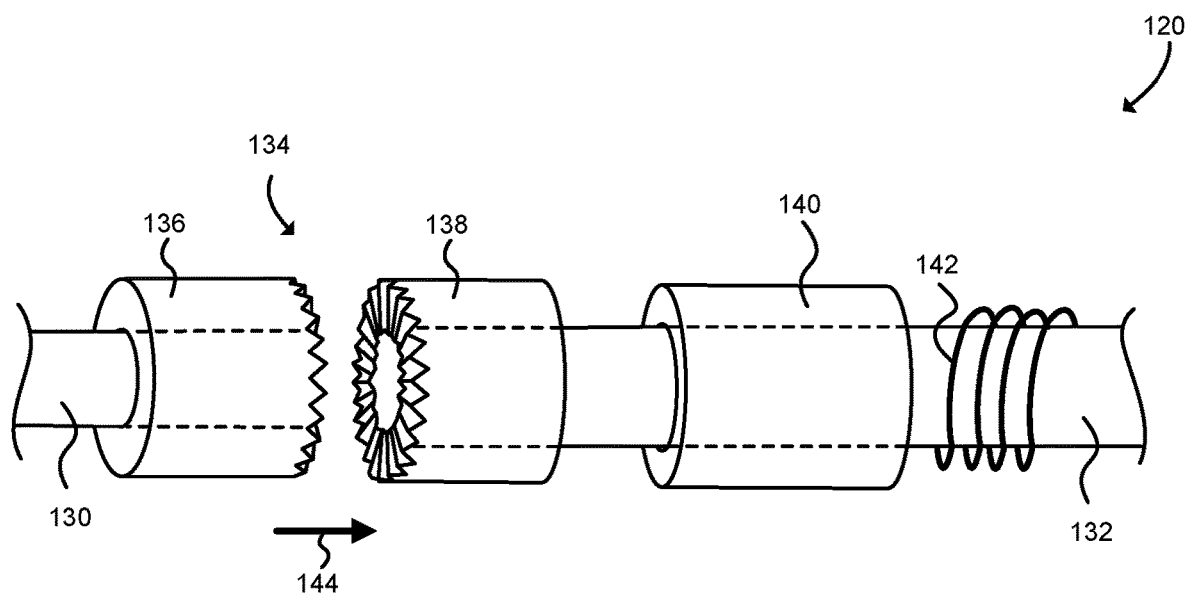
FIG. 3 is a cutaway view of at least one embodiment of a hinge of the dual-screen computing device of FIG. 1 in a disengaged configuration.

The computing device 100 also includes a hinge 120 that couples the secondary screen housing 104 to the base housing 106. One potential embodiment of the hinge 120 is shown in FIGS. 2-3 and described further below. As shown, the hinge 120 allows the secondary screen housing 104 to rotate relative to the base housing 106 about a pivot axis 122. As described further below, the secondary screen housing 104 may pivot freely in a raising direction 124 toward the base housing 106. The hinge 120 includes a selectively engageable locking function that prevents rotation of the secondary screen housing 104 in a lowering direction 126 away from the base housing 106. Thus, when the locking function of the hinge 120 is engaged, the secondary screen housing 104 may be held in a raised position without pivoting in the lowering direction 126. The computing device 100 further includes a trigger 128 coupled to the hinge 120. When the trigger 128 is operated by a user, the locking function of the hinge 120 is disengaged. When the locking function of the hinge 120 is disengaged, the secondary screen housing 104 may pivot in the lowering direction 126. The trigger 128 is illustratively embodied as a spring-loaded pushbutton that, when pressed by the user, disengages the hinge 120 and, when released by the user, allows the hinge 120 to re-engage. In other embodiments, the trigger 128 may be embodied as any lever, control arm, or other device that allows the user to selectively engage and disengage the locking function of the hinge 120.

Thus, the computing device 100 may allow the user to easily articulate both the primary display housing 102 and the secondary display housing 104 to achieve ergonomic or otherwise desirable viewing angles of the display screens 108, 110. The hinge 120 may be operated with relatively low amounts of torque or other input forces, which may improve ease of operation and prevent damage to fragile display screens or other components caused by excessive force. For example, a dual-screen clamshell device using typical torque hinges for both pivot axes may require about 25 kgf·cm to hold the secondary screen, which may be about twice the amount of torque used in conventional single-screen clamshell devices, with a shorter lever arm. Additionally, the hinge 120 may provide a high degree of fine adjustability.

Although the housing 120 is illustrated in FIGS. 1 and 4-7 as connecting to each end of the secondary screen housing 104 and the base housing 106, respectively, it should be understood that in some embodiments, the hinge 120 may be coupled to different positions on the housings 104, 106. For example, in some embodiments the hinge 120 may attach to a position in the middle of the base housing 106, allowing the base housing 106 to extend underneath the secondary screen housing 104 (e.g., to improve stability).

Referring now to FIGS. 2-3, an embodiment of the hinge 120 is shown. FIG. 2 illustrates the hinge 120 when the locking function is engaged, and FIG. 3 illustrates the hinge 120 when the locking function is disengaged. The hinge 120 includes a drive shaft 130 and a driven shaft 132. The drive shaft 130 is fixed to the secondary screen housing 104. The shafts 130, 132 are joined by a coupling joint 134. The coupling joint 134 is illustratively a Hirth joint. As shown, each of the shafts 130, 132 includes a toothed end 136, 138, respectively. Each of the toothed ends 136, 138 include multiple teeth, grooves, or other serrations that mesh with the teeth of the other end. When the ends 136, 138 are engaged together, the teeth interlock and the shafts 130, 132 are mechanically connected. Although illustrated as a Hirth joint, it should be understood that in other embodiments the coupling joint 134 may be embodied as any joint that allows the shafts 130, 132 to be selectively engaged together.

The hinge 120 further includes a one-way needle bearing 140 that is fixed to the base housing 106. The driven shaft 132 passes through the one-way needle bearing 140. The one-way needle bearing 140 allows the driven shaft 132 to rotate freely in one direction, illustratively in the raising direction 124. The one-way needle bearing 140 does not allow the driven shaft 132 to rotate in the other direction, illustratively the lowering direction 126. The one-way needle bearing 140 is illustratively a unidirectional needle bearing that includes multiple rollers within a race with a profiled surface. The rollers allow the driven shaft 132 to rotate in the raising direction 124 with minimal friction. When the driven shaft 132 is rotated in the lowering direction 126, the profiled surface of the race causes the rollers to wedge against the driven shaft 132, preventing rotation in the lowering direction 126. Each roller may be coupled to a spring for instantaneous lockup, which may eliminate or reduce backplay.

As shown, the hinge 120 further includes a spring 142. The spring 142 biases the driven shaft 132 against the drive shaft 130, causing the coupling joint 134 to be normally engaged. As best shown in FIG. 3, a disengaging force 144 may work against the biasing force of the spring 142 to disengage the coupling joint 134 by separating the toothed ends 136, 138. When the coupling joint 134 is disengaged, the shafts 130, 132 are no longer mechanically connected and may rotate independently. Note that the disengaging force 144 is perpendicular to load forces of the coupling joint 134, and thus a relatively low amount of force may disengage the coupling joint 134. The disengaging force 144 is illustratively applied by the trigger 128. Additionally or alternatively, although illustrated as a spring 142, it should be understood that in some embodiments the hinge 120 may include a different biasing member that biases the coupling joint 134 to be normally engaged. For example, the hinge 120 may include a shape-memory alloy (SMA) member that biases the coupling joint 134 to be normally engaged. In that example, SMA member changes shape in response to application of an electrical current, which disengages the coupling joint 134. When the electrical current ceases, the SMA member returns to its original shape, which engages the coupling joint 134.

Figure 5:
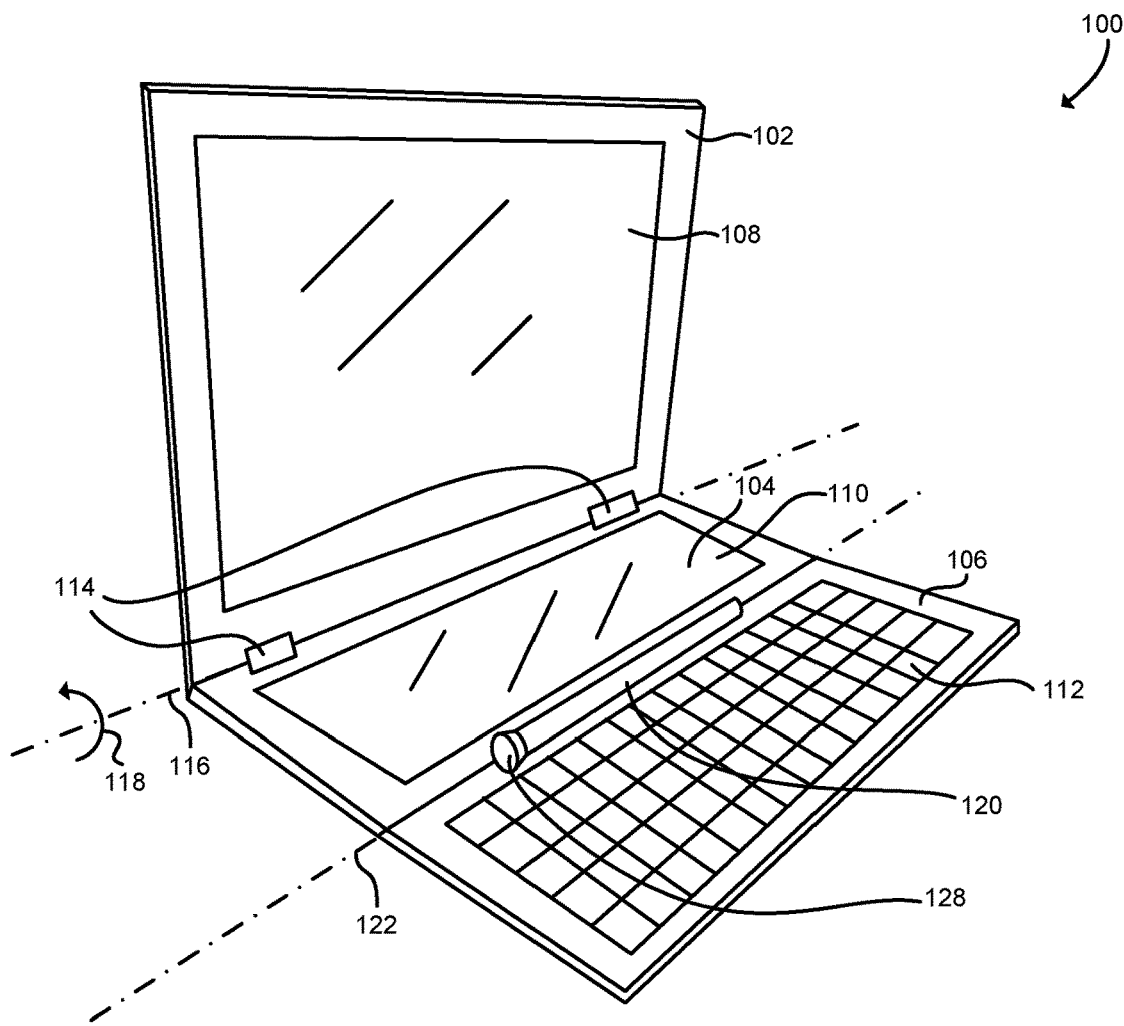
FIG. 5 is a perspective view of the dual-screen computing device of FIGS. 1-4 in an open configuration.

Referring now to FIGS. 4-7, operation of the computing device 100 including operation of the hinge 120 is illustrated. As shown in FIG. 4, the computing device 100 may be initially in a closed configuration. As shown in FIG. 5, a user may open the computing device 100 by rotating the primary screen housing 102 in the direction 118 about the axis 116. As shown, after being opened the secondary screen housing 104 and the base housing 106 may lie flat in the same plane, for example on a tabletop (not shown). Thus, the computing device 100 may be used similarly to a traditional laptop, notebook, or other single-hinge clamshell device.

Figure 6:
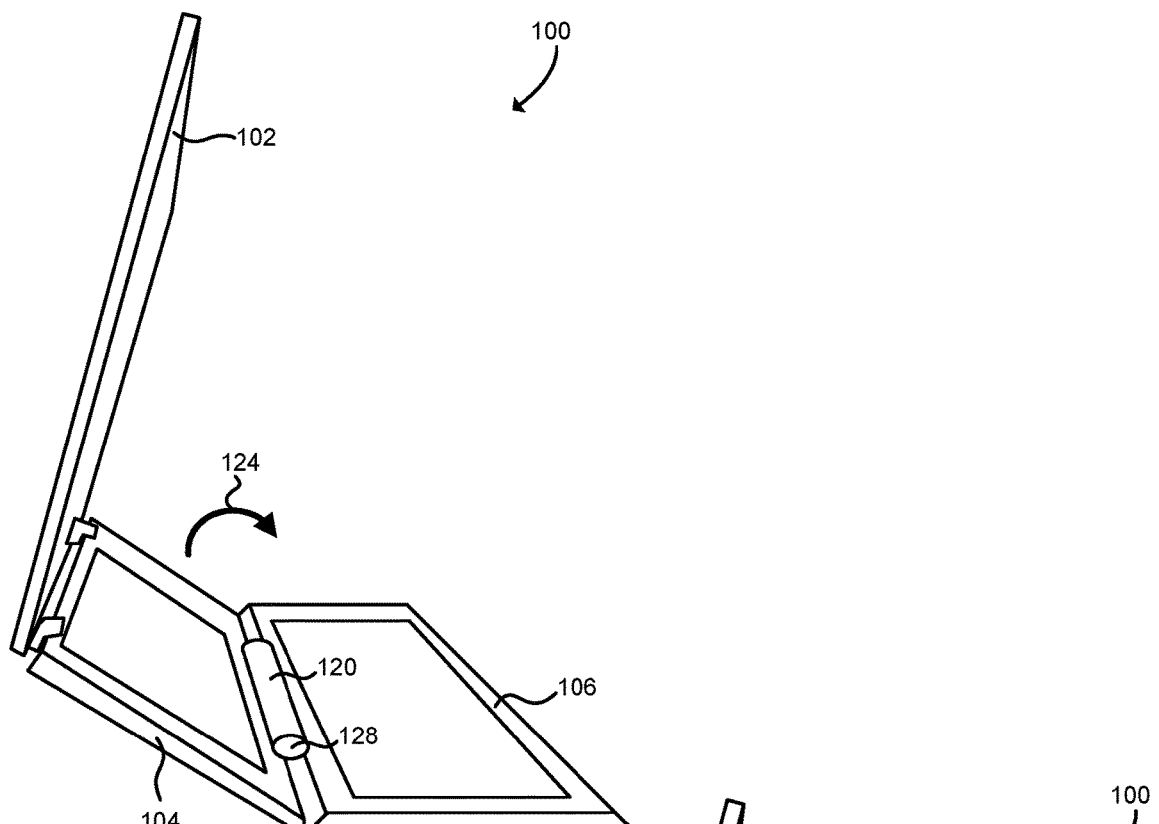
FIG. 6 is a perspective view of the dual-screen computing device of FIGS. 1-5 with a secondary display housing being raised.

As shown in FIG. 6, the user may raise the secondary screen housing 104 in the raising direction 124, toward the base housing 106. As the secondary screen housing 104 is raised, the drive shaft 130 rotates with the secondary screen housing 104. The coupling joint 134 is engaged, causing the driven shaft 132 to rotate with the drive shaft 130. The driven shaft 132 rotates within the one-way bearing 140 in the raising direction 124. When the user stops raising the secondary screen housing 104, the one-way bearing 140, fixed to the base housing 106, prevents rotation of the driven shaft 132 in the lowering direction 126. Accordingly, the secondary screen housing 104 is held in the position selected by the user.

Figure 7:
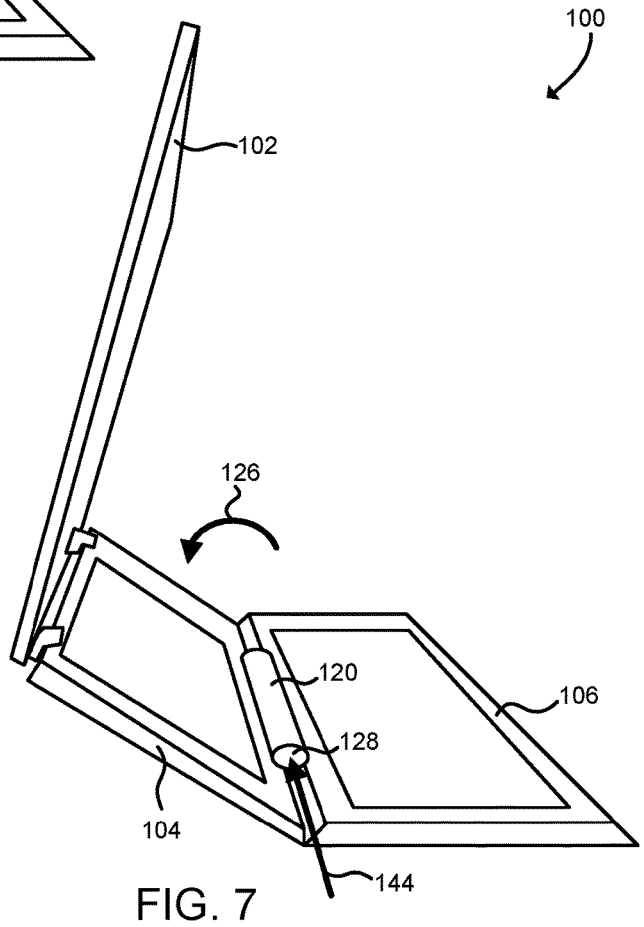
FIG. 7 is a perspective view of the dual-screen computing device of FIGS. 1-6 with the secondary display housing being lowered.

As shown in FIG. 7, the user may apply the disengaging force 144 to the trigger 128. As described above, the disengaging force 144 disengages the coupling joint 134. The user may rotate the secondary screen housing in the lowering direction 126, for example toward the tabletop. As the secondary screen housing 104 is lowered, the drive shaft 130 rotates with the secondary screen housing 104. Because the coupling joint 134 is disengaged, the drive shaft 130 rotates independently of the driven shaft 132, allowing the secondary screen housing to rotate freely in the lowering direction 126.

Figure 8:
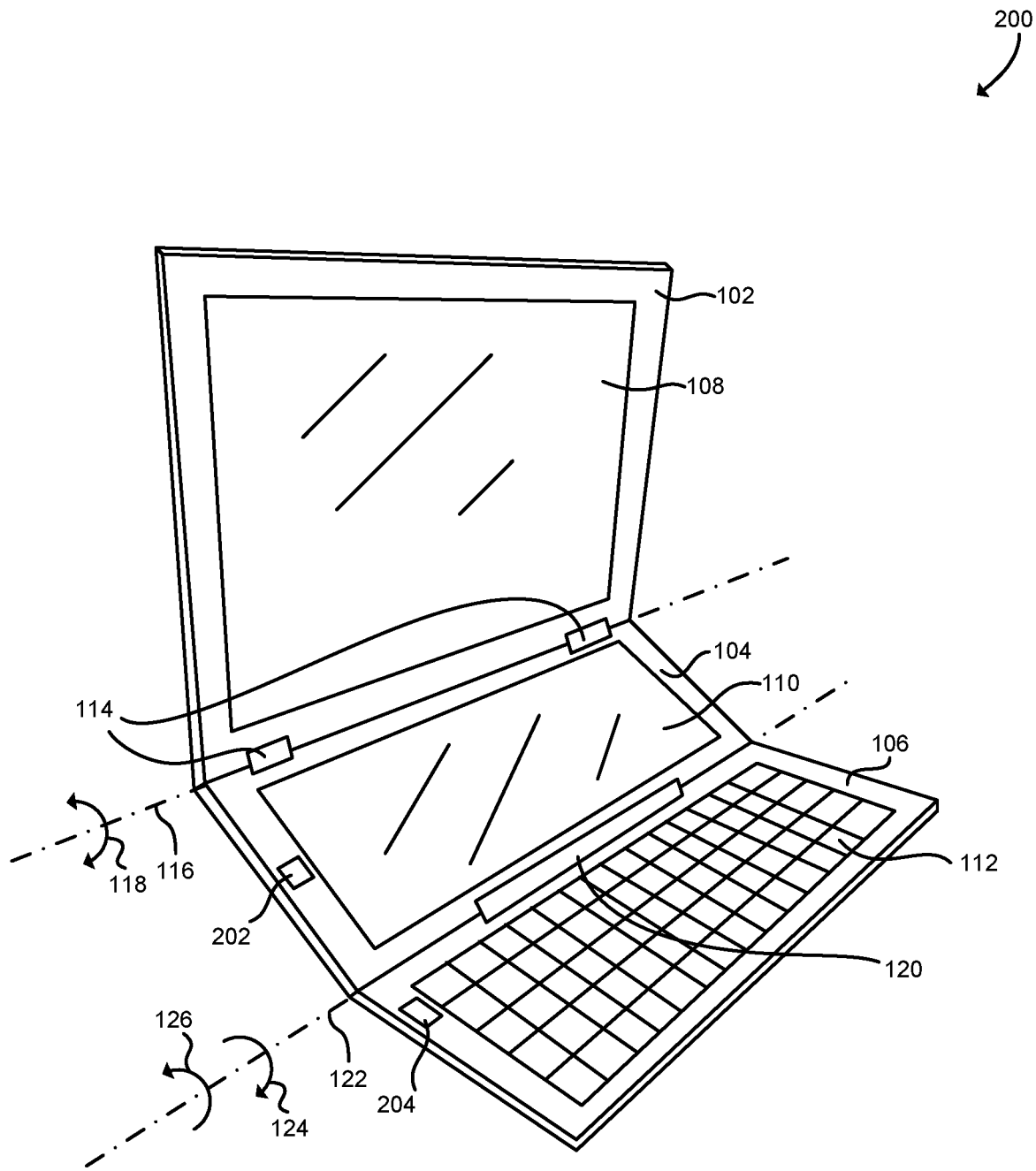
FIG. 8 is a perspective view of another embodiment of a dual-screen computing device.

Referring now to FIG. 8, another embodiment of a dual-screen computing device 200 is shown. As shown, and similar to the computing device 100 of FIGS. 1-7, the computing device 200 includes a primary screen housing 102, a secondary screen housing 104, and a base housing 106. The screen housings 102, 104 include a primary display screen 108 and a secondary display screen 110, respectively, and the base housing 106 includes a keyboard 112. Similar to the computing device 100, the computing device 200 includes hinges 114 that couple the primary screen housing 102 and the secondary display housing 104. The hinges 114 allow the primary screen housing 102 to rotate relative to the secondary display housing 104 about a pivot axis 116 in either direction 118.

Also similar to the computing device 100, the computing device 200 includes a hinge 120 that couples the secondary screen housing 104 and the base housing 106, as described above in connection with FIGS. 2-3. As described above, the hinge 120 allows the secondary screen housing 104 to rotate relative to the base housing 106 about a pivot axis 122. The hinge 120 allows the secondary screen housing 104 to pivot freely in a raising direction 124 toward the base housing 106, and includes a selectively engageable locking function that prevents rotation of the secondary screen housing 104 in a lowering direction 126 away from the base housing 106.

The illustrative hinge 120 of FIG. 8 includes a shape-memory alloy (SMA) biasing member 142. As described above, the SMA biasing member 142 biases the coupling joint 134 to be normally engaged. The SMA biasing member 142 changes shape in response to application of an electrical current, which disengages the coupling joint 134. When the electrical current ceases, the SMA biasing member 142 returns to its original shape, which engages the coupling joint 134.

The computing device 200 further includes two touch sensors 202, 204. Each of the touch sensors 202, 204 may be embodied as any resistive sensor, capacitive sensor, mechanical switch, or other device that senses when a user touches the sensor 202, 204. In use, when a user touches both touch sensors 202, 204 simultaneously, electrical current is applied to the SMA biasing member 142. For example, touching both touch sensors 202, 204 may complete an electrical circuit, activate an electrical switch or relay, or otherwise energize the SMA biasing member 142 with electrical current. Thus, in use, a user may touch both sensors 202, 204 (e.g., with fingers of one hand) and lower the secondary screen housing 104 (e.g., with the other hand). Illustratively, the touch sensor 202 is positioned on the secondary screen housing 104 and the touch sensor 204 is positioned on the base housing 106. However, it should be understood that in other embodiments, the touch sensors 202, 204 may be positioned in any location that is ergonomic or otherwise convenient for the user. Additionally or alternatively, it should be understood that the computing device 200 may include a different number and/or arrangement of touch sensors.

EXAMPLES

Illustrative examples of the technologies disclosed herein are provided below. An embodiment of the technologies may include any one or more, and any combination of, the examples described below.

Example 1 includes a portable computing device for interactive computing, the portable computing device comprising: a secondary screen housing that includes a display screen; a base housing; a hinge rotationally coupled between the secondary screen housing and the base housing, wherein the hinge comprises: a first shaft fixedly coupled to the secondary screen housing; a second shaft rotationally coupled to the base housing; a one-way needle bearing fixedly coupled to the base housing, wherein the second shaft passes through the one-way needle bearing, and wherein the one-way needle bearing allows the second shaft to freely rotate in a first direction, and wherein the one-way needle bearing prevents rotation of the second shaft in a second direction; and a coupling joint that selectively couples the first shaft and the second shaft; and a trigger that is operable to selectively engage and disengage the coupling joint of the hinge.

Example 2 includes the subject matter of Example 1, and wherein the coupling joint comprises a Hirth joint.

Example 3 includes the subject matter of any of Examples 1 and 2, and wherein the coupling joint comprises a first toothed end coupled to the first shaft and a second toothed end coupled to the second shaft, wherein the first toothed end mechanically engages the second toothed end when the coupling joint is engaged.

Example 4 includes the subject matter of any of Examples 1-3, and wherein the hinge further comprises a biasing member coupled to the coupling joint, wherein the biasing member biases the coupling joint to be engaged.

Example 5 includes the subject matter of any of Examples 1-4, and wherein the biasing member comprises a spring.

Example 6 includes the subject matter of any of Examples 1-5, and wherein the trigger comprises lever that mechanically operates against the spring to disengage the coupling joint.

Example 7 includes the subject matter of any of Examples 1-6, and wherein the biasing member comprises a shape-memory alloy member.

Example 8 includes the subject matter of any of Examples 1-7, and wherein the trigger comprises an electrical switch that is operable to selectively energize the shape-memory alloy member to disengage the coupling joint.

Example 9 includes the subject matter of any of Examples 1-8, and further comprising a first touch sensor and a second touch sensor, wherein the electrical switch energizes the shape-memory alloy in response to the first touch sensor and the second touch sensor being simultaneously touched by a user of the portable computing device.

Example 10 includes the subject matter of any of Examples 1-9, and wherein the secondary screen housing comprises the first touch sensor and the base housing comprises the second touch sensor.

Example 11 includes the subject matter of any of Examples 1-10, and further comprising: a primary screen housing that includes a second display screen; and a second hinge rotationally coupled between the primary screen housing and the secondary screen housing, wherein the second hinge allows rotation of the primary screen housing relative to the second display screen housing about a second pivot axis in a first rotational direction and a second rotational direction.

Example 12 includes the subject matter of any of Examples 1-11, and wherein the base housing comprises a user input device.

Example 13 includes the subject matter of any of Examples 1-12, and wherein the user input device comprises a keyboard, a touchscreen, or a touchpad.

Example 14 includes a hinge for rotationally coupling a first member and a second member, the hinge comprising: a first shaft fixedly coupled to the first member; a second shaft rotationally coupled to the second member; a one-way needle bearing fixedly coupled to the second member, wherein the second shaft passes through the one-way needle bearing, and wherein the one-way needle bearing allows the second shaft to freely rotate in a first rotational direction, and wherein the one-way needle bearing prevents rotation of the second shaft in a second rotational direction; a coupling joint that selectively couples the first shaft and the second shaft, wherein the first shaft and the second shaft are rotationally fixed when the coupling joint is engaged, and wherein the first shaft and the second shaft are rotationally independent when the coupling joint is disengaged; and a trigger that is operable to selectively engage and disengage the coupling joint.

Example 15 includes the subject matter of Examples 14, and wherein the coupling joint comprises a Hirth joint.

Example 16 includes the subject matter of any of Examples 14 and 15, and wherein the coupling joint comprises a first toothed end coupled to the first shaft and a second toothed end coupled to the second shaft, wherein the first toothed end mechanically engages the second toothed end when the coupling joint is engaged.

Example 17 includes the subject matter of any of Examples 14-16, and further comprising a biasing member coupled to the coupling joint, wherein the biasing member biases the coupling joint to be engaged.

Example 18 includes the subject matter of any of Examples 14-17, and wherein the trigger comprises a lever that mechanically operates against the biasing member to disengage the coupling joint.

Example 19 includes the subject matter of any of Examples 14-18, and wherein the biasing member comprises a shape-memory alloy member.

Example 20 includes the subject matter of any of Examples 14-19, and wherein the trigger comprises an electrical switch that is operable to selectively energize the shape-memory alloy member to disengage the coupling joint.

The invention claimed is:

1. A housing for a portable computing device, the housing comprising:
a secondary screen housing to contain a display screen;
a base housing;
a hinge rotationally coupled between the secondary screen housing and the base housing, the hinge including:
a first shaft fixedly coupled to the secondary screen housing,
a second shaft rotationally coupled to the base housing,
a one-way needle bearing fixedly coupled to the base housing, the second shaft passing through the one-way needle bearing, the one-way needle bearing allowing the second shaft to freely rotate in a first direction, the one-way needle bearing preventing rotation of the second shaft in a second direction, and
a coupling joint that selectively couples the first shaft and the second shaft; and
a trigger that is operable to selectively engage and disengage the coupling joint of the hinge.

2. The housing of claim 1, wherein the coupling joint includes a Hirth joint.

3. The housing of claim 1, wherein the coupling joint includes a first toothed end coupled to the first shaft and a second toothed end coupled to the second shaft, the first toothed end to mechanically engage the second toothed end when the coupling joint is engaged.

4. The housing of claim 1, wherein the hinge further includes a biasing member coupled to the coupling joint, the biasing member to bias the coupling joint to be engaged.

5. The housing of claim 4, wherein the biasing member includes a spring.

6. The housing of claim 5, wherein the trigger includes a lever that mechanically operates against the spring to disengage the coupling joint.

7. The housing of claim 4, wherein the biasing member includes a shape-memory alloy member.

8. The housing of claim 7, wherein the trigger includes an electrical switch that is operable to selectively energize the shape-memory alloy member to disengage the coupling joint.

9. The housing of claim 8, further including a first touch sensor and a second touch sensor, the electrical switch to energize the shape-memory alloy member in response to the first touch sensor and the second touch sensor being simultaneously touched by a user of the housing.

10. The housing of claim 9, wherein the secondary screen housing includes the first touch sensor and the base housing includes the second touch sensor.

11. The housing of claim 1, further including:
a primary screen housing to contain a second display screen; and a second hinge rotationally coupled between the primary screen housing and the secondary screen housing, the second hinge to allow rotation of the primary screen housing relative to the second display screen housing about a second pivot axis in a first rotational direction and a second rotational direction.

12. The housing of claim 1, wherein the base housing is to contain a user input device.

13. The housing of claim 12, wherein the user input device includes at least one of a keyboard, a touchscreen, or a touchpad.

14. A housing for a portable computing device, the housing comprising:
   a secondary screen housing to contain a display screen;
   a base housing;
   hinge means coupled between the secondary screen housing and the base housing; and
   a trigger that is operable to selectively engage and disengage a locking function of the hinge means, wherein the hinge means is to:
      allow the secondary screen housing to rotate relative to the base housing about a pivot axis in a first direction when the locking function is engaged;
      prevent the secondary screen housing from rotating relative to the base housing about the pivot axis in a second direction when the locking function is engaged; and
      allow the secondary screen housing to rotate in the first direction when the locking function is disengaged.

15. The housing of claim 14, wherein the first direction is toward the base housing and the second direction is away from the base housing.

16. The housing of claim 14, further including:
   a primary screen housing to contain a second display screen; and
   second hinge means coupled between the primary screen housing and the secondary screen housing, the second hinge means to allow rotation of the primary screen housing relative to the second display screen housing about a second pivot axis in a first rotational direction and a second rotational direction.

17. The housing of claim 14, wherein the trigger includes a lever that mechanically engages and disengages the locking function of the hinge means.

18. The housing of claim 14, wherein the trigger includes an electrical switch that is operable to engage and disengage the locking function of the hinge means.

19. The housing of claim 14, wherein the base housing is to contain a user input device.

20. The housing of claim 19, wherein the base housing is to contain a user input device that includes at least one of a keyboard, a touchscreen, or a touchpad.

* * * * *